(12) United States Patent
Ueno

(10) Patent No.: US 6,617,589 B2
(45) Date of Patent: Sep. 9, 2003

(54) REPAIR APPARATUS FOR A VEHICLE

(75) Inventor: Makoto Ueno, Tagajo (JP)

(73) Assignee: Tateo Uegaki, Miyagi (JP)

( * ) Notice: Subject to any disclaimer, the term of this patent is extended or adjusted under 35 U.S.C. 154(b) by 0 days.

(21) Appl. No.: 09/958,086

(22) PCT Filed: Apr. 9, 2001

(86) PCT No.: PCT/JP01/00803

§ 371 (c)(1),
(2), (4) Date: Oct. 4, 2001

(87) PCT Pub. No.: WO01/56846

PCT Pub. Date: Aug. 9, 2001

(65) Prior Publication Data

US 2002/0158209 A1 Oct. 31, 2002

(30) Foreign Application Priority Data

Feb. 4, 2000 (JP) ............................ 2000-28410

(51) Int. Cl.[7] .............................................. A61C 19/06
(52) U.S. Cl. .................................. 250/455.11; 427/140
(58) Field of Search ................... 427/140, 508; 250/455.11; 156/498; 34/9

(56) References Cited

U.S. PATENT DOCUMENTS

| | | | | |
|---|---|---|---|---|
| 4,960,611 A | * | 10/1990 | Fujisawa | 427/43.1 |
| 5,095,639 A | * | 3/1992 | Slavin, Jr. | 34/4 |
| 5,803,729 A | * | 9/1998 | Tsimerman | 433/29 |
| 6,020,023 A | * | 2/2000 | Keller et al. | 427/140 |
| 6,257,297 B1 | * | 7/2001 | Chenetski | 156/498 |
| 6,319,562 B1 | * | 11/2001 | Arverus et al. | 427/475 |

FOREIGN PATENT DOCUMENTS

| | | |
|---|---|---|
| JP | 58-79901 | 5/1983 |
| JP | 8039577 | 2/1996 |

* cited by examiner

Primary Examiner—John R. Lee
Assistant Examiner—Phillip A Johnston
(74) Attorney, Agent, or Firm—Alston & Bird LLP

(57) ABSTRACT

A repair apparatus for a vehicle, more particularly, a repair assisting apparatus is provided. The apparatus includes a box having an opening; an ultraviolet rays irradiation device arranged in the box having an irradiation unit for irradiating ultraviolet rays; an infrared rays irradiation device arranged in the box having an irradiation unit for irradiating infrared rays; a first blower for cooling the irradiation unit for irradiating ultraviolet rays; and a second blower for sending hot air from the irradiation unit for irradiating infrared rays to the opening side. The apparatus can efficiently accelerate curing polymerization of putties or paints.

14 Claims, 12 Drawing Sheets

FIG. 12

| | TRIAL RUN No. | 1 | 2 | 3 | 4 | 5 | 6 | 7 | 8 |
|---|---|---|---|---|---|---|---|---|---|
| TRIAL RUN CONDITIONS | IRRADIATION METHOD | INVERSION METHOD | INVERSION METHOD | INVERSION METHOD | INSTANTANEOUS LIGHTING METHOD | INSTANTANEOUS LIGHTING METHOD | INSTANTANEOUS LIGHTING METHOD | INSTANTANEOUS LIGHTING METHOD | INSTANTANEOUS LIGHTING METHOD |
| | IRRADIATION DISTANCE | 500mm | 300mm | 300mm | 500mm | 300mm | 300mm | 300mm | 300mm |
| | IRRADIATION TIME | 90 SECONDS | 90 SECONDS | 45 SECONDS | 90 SECONDS | 90 SECONDS | 45 SECONDS | 90 SECONDS | 90 SECONDS |
| | PROTECING GLASS | HEAT RESISTANT GLASS | HEAT RESISTANT GLASS | HEAT RESISTANT GLASS | HEAT RESISTANT TEMPERED GLASS | HEAT RESISTANT TEMPERED GLASS | HEAT RESISTANT GLASS + | HEAT RESISTANT GLASS | HEAT RESISTANT GLASS |
| | IRRADIATION INTENSITY | 4kw | 4kw | 4kw | 4kw | 4kw | 4kw | 4kw | 2.9kw |
| DEPTH OF PUTTY CURING | AVERAGE $X$ | 4.41mm | 4.17mm | 3.53mm | 4.23mm | 4.32mm | 3.29mm | 4.62mm | 4.40mm |
| | MAXIMUM CURING DEPTH $X_{max}$ | 4.95mm | 4.35mm | 4.15mm | 4.52mm | 4.41mm | 3.56mm | 4.85mm | 4.65mm |
| | MINIMUM CURING DEPTH $X_{min}$ | 3.70mm | 3.90mm | 3.25mm | 3.91mm | 4.15mm | 3.10mm | 4.40mm | 4.08mm |
| | PUTTY SURFACE CURING PROPERTY | ○ | ○ | ○ | × STICKING | × STICKING | × STICKING | ○ | ○ |

FIG. 13

SOLVENT REMOVABILITY TEST

| TRIAL RUN No. | OPERATION MODE | | SOLVENT USED | MEASUREMENT POINT | SOLVENT REMOVAL RATIO % | AVERAGE % |
|---|---|---|---|---|---|---|
| | | START 1min 2min 3min | | | | |
| No.1 | HEATER<br>FAN | | XYLENE | 7<br>21<br>*<br>5<br>26 | 72.3<br>73.4<br>78.3<br>78.3<br>78.6 | 76.2 |
| No.2 | HEATER<br>FAN | | XYLENE | 7<br>21<br>*<br>5<br>26 | 77.3<br>82.9<br>84.7<br>85.1<br>91.2 | 84.2 |
| No.3 | HEATER<br>FAN (NO FAN) | | XYLENE | 7<br>21<br>*<br>5<br>26 | 48.8<br>42.1<br>44.1<br>51.6<br>54.0 | 48.1 |
| No.4 | HEATER<br>FAN | | TOLUENE | 7<br>21<br>*<br>5<br>26 | 87.1<br>83.5<br>84.0<br>88.1<br>89.0 | 86.3 |

Note) Measurement points * are points of intersection of 12, 13, 19 and 20 in Fig. 11.

REPAIR APPARATUS FOR A VEHICLE

TECHNICAL FIELD

The present invention relates to a repair apparatus for a vehicle and more particularly to a repair assisting apparatus for a car body panel.

BACKGROUND ART

In a case where a coated surface, in particular a coated surface of an automobile is repaired, coating is generally performed after a damaged portion is formed into a normal shape. In this forming process, putties are mainly used, and in the coating process, primer-surfacers or paints are used.

As such putties and coatings, those that are dissolved in volatile (so-called lacquer-based) solvents have been conventionally used. However, they take a considerable time period before they become cured so that they have poor workability.

Accordingly, it may be considered to use putty which is made of an ultraviolet curing resin and exposed to ultraviolet rays there to after coating in order to greatly reduce its curing time. A ultraviolet rays irradiation device for irradiating ultraviolet rays is an device having an ultraviolet lamp as a major component and can be turned on as arranged close to the body of a vehicle.

However, the above-mentioned ultraviolet rays irradiation device can only cure ultraviolet ray curing resins. Therefore, separately, a hot-air device needs to be provided for accelerating the curing polymerization of primer-surfacers or paints practiced after the curing of the putty. This is because the primer-surfacers or paints commonly comprise lacquer based, acrylic based or urethane based compositions, which require heating action for evaporating the volatile components contained therein.

Therefore, in a series of coating and repairing operations, an ultraviolet rays irradiation device and a hot-air device, which are relatively large devices, are used separately so that the working efficiency is poor.

DISCLOSURE OF THE INVENTION

Under the circumstances, the present invention has been made and an object of the present invention is to provide a repair apparatus for a vehicle that can perform acceleration of curing polymerization of a coated surface (repair surface) in a series of coating and repairing operations with a single apparatus to greatly improve the working efficiency.

Therefore, the present invention provides a repair apparatus for a vehicle, comprising: a box having an opening; an ultraviolet rays irradiation device arranged in the box having an irradiation unit for irradiating ultraviolet rays; an infrared rays irradiation device having an irradiation unit arranged in the box for irradiating infrared rays; a first blower for cooling the irradiation unit for irradiating ultraviolet rays; and a second blower for sending hot air from the irradiation unit for irradiating infrared rays to the opening side.

The ultraviolet rays irradiation device may be any device that can irradiate ultraviolet rays. For example, it may be an instantaneous lighting ultraviolet (UV) lamp. The infrared rays irradiation device may be any device that can irradiated infrared rays. For example, an infrared ray (IR) heater or an infrared ray lamp may be used. The first and second blowers may be provided inside the box or outside the box. One or a plurality of the respective irradiation devices and respective blowers may be each provided.

In the apparatus of the present invention, the first blower and the second blower may be identical.

That is, the single blower cools the violet rays irradiation unit and at the same time sends hot air from the infrared irradiation unit to the opening side.

Further, the apparatus of the present invention may be provided with a control means that can individually control the ultraviolet rays irradiation device, the infrared rays irradiation device, the first blower, and the second blower. The control means may be any that can control an irradiation time period period, a blowing time period, irradiation output, blow amount and so forth. For example, it is desirable that the control means be constituted by a timer that can automatically control each device with lapse of time, an output adjusting circuit that can adjust the output of each device or the like. Alternatively, each irradiation device and each blower may be constituted by a plurality of devices, respectively, and a plurality of relay circuits may be provided that can optionally increase or decrease the number of active devices among them. Here, the term "adjust the output" is an idea that encompasses adjustment of illumination.

Also, in the present invention, the box may be expansible and shrinkable in the same direction of irradiation by the above-mentioned respective irradiation devices. That is, it is satisfactory that the opening of the box can be made close to the working surface for repairing utilizing the elasticity of the box. Here, the term "box" is an idea that includes not only box itself but also any member provided with the box. For example, an elastic member may be provided to the opening of the box so that the elasticity of the member can be utilized.

Also, the repair apparatus for a vehicle of the present invention may be constructed such that the box comprises a holding plate for holding the respective irradiation devices. On the lower surface of the holding plate, a plurality of irradiation units of the infrared rays irradiation device are arranged so as to extend parallel to the lower surface and radially from a center of the lower surface. And, between any two adjacent irradiation units of the infrared rays irradiation device, the irradiation units of the ultraviolet rays irradiation device are arranged so as to extend parallel to the lower surface. Here, the term "the lower surface of the holding plate" refers to the surface positioned on the side of the opening of the box.

Further, the repair apparatus of the present invention comprises a support rack for supporting the box. The support rack has a longitudinal frame and a transverse frame slidably held to the longitudinal frame. The box may be constructed such that it can be held swingably on the transverse frame. In other words, it is satisfactory that the support rack can support the box at an optional height or in an optional direction.

As described above, the repair apparatus for a vehicle according to the present invention can respond to acceleration of curing polymerization of every kind of putties or paints with a single apparatus so that the operation with switching two apparatuses is no longer necessary. Furthermore, since respective irradiation devices and blowers can be individually controlled, each device can be operated efficiently. As a result, the putties or paints can be cured (dried) in a shorter time period.

Also, in the present invention, a single blower can serve as the respective blowers, i.e., one that cools the ultraviolet rays irradiation unit and the other that sends the air warmed by the infrared rays irradiation unit to the opening side. Also, the respective irradiation devices are sufficiently arranged to a face plate portion of the holding plate. Accordingly, downsizing and reduction in weight of the repair apparatus for a vehicle can be realized to increase the operationality.

Further, in the present invention, the box may be made elastic and a support rack for supporting the box is provided, so that adaptation of the repair apparatus for a vehicle to the repair work surface becomes exceedingly easy. This contributes to a reduction in the working time period for repairing.

Furthermore, elasticity of the box can prevent unnecessary irradiation of ultraviolet rays or of infrared rays to areas other than the repair work surface. As a result, all the irradiated rays from the respective irradiation devices can surely be directed to the repair work surface without loss. In addition, the air warmed by the infrared rays can be led to the repair work surface efficiently.

BRIEF DESCRIPTION OF THE DRAWINGS

FIG. 12 is a diagram illustrating curing depth of putty depending on conditions of ultraviolet rays irradiation.

FIG. 13 is a diagram illustrating results of solvent removal tests.

BEST MODE FOR CARRYING OUT THE INVENTION

Figure 1:
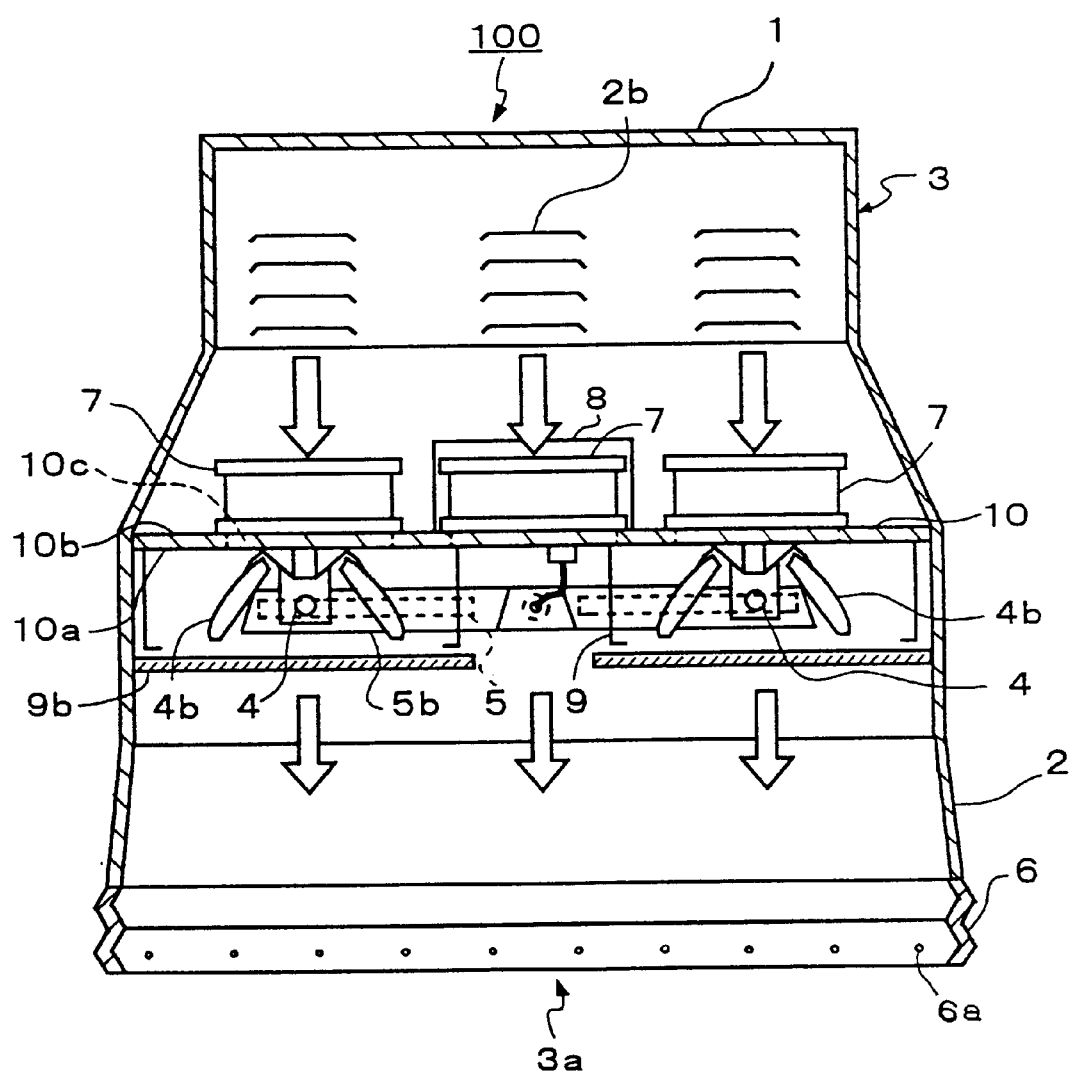
FIG. 1 is a front elevational view showing a repair apparatus for a vehicle according to an embodiment of the present invention.
Figure 2:
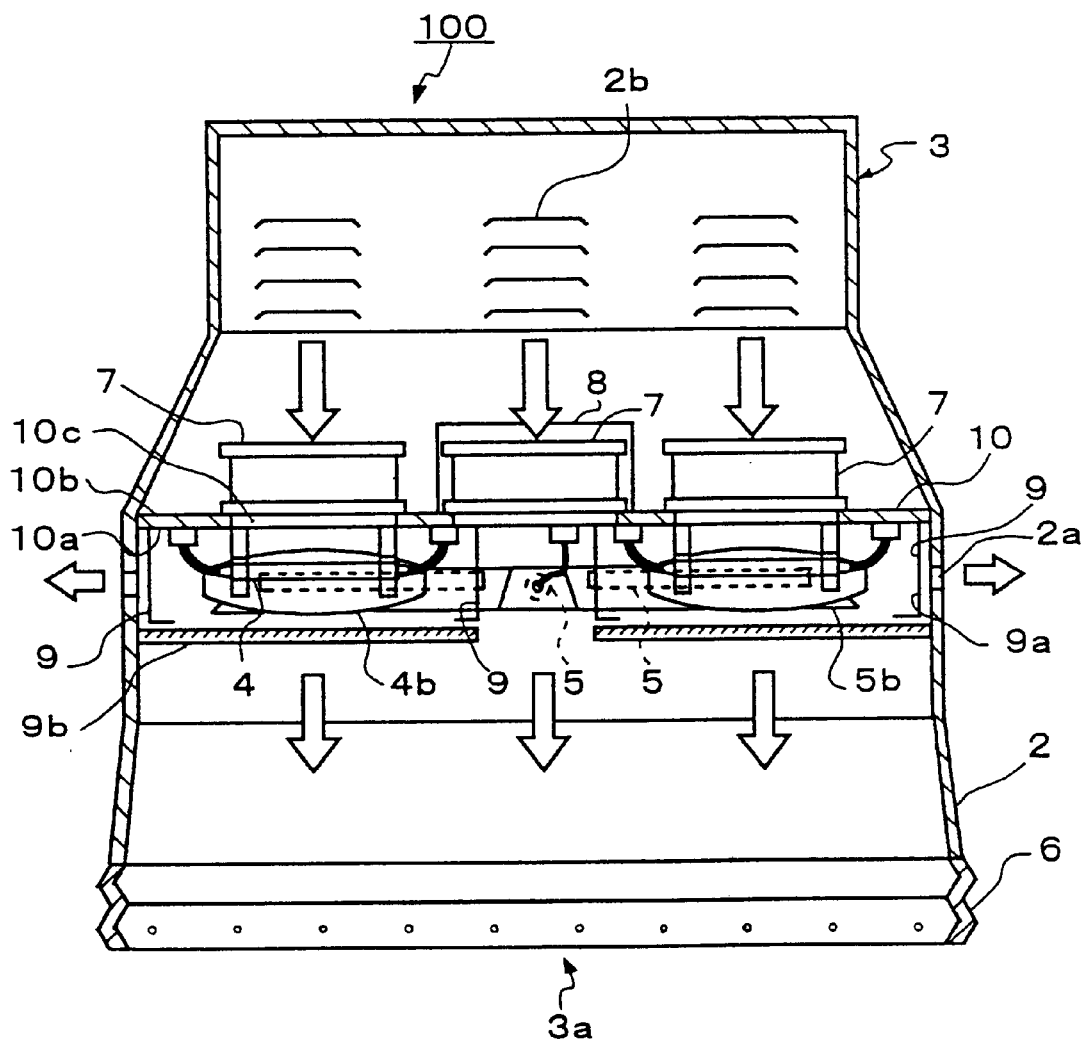
FIG. 2 is a side elevational view showing the repair apparatus of FIG. 1.
Figure 3:
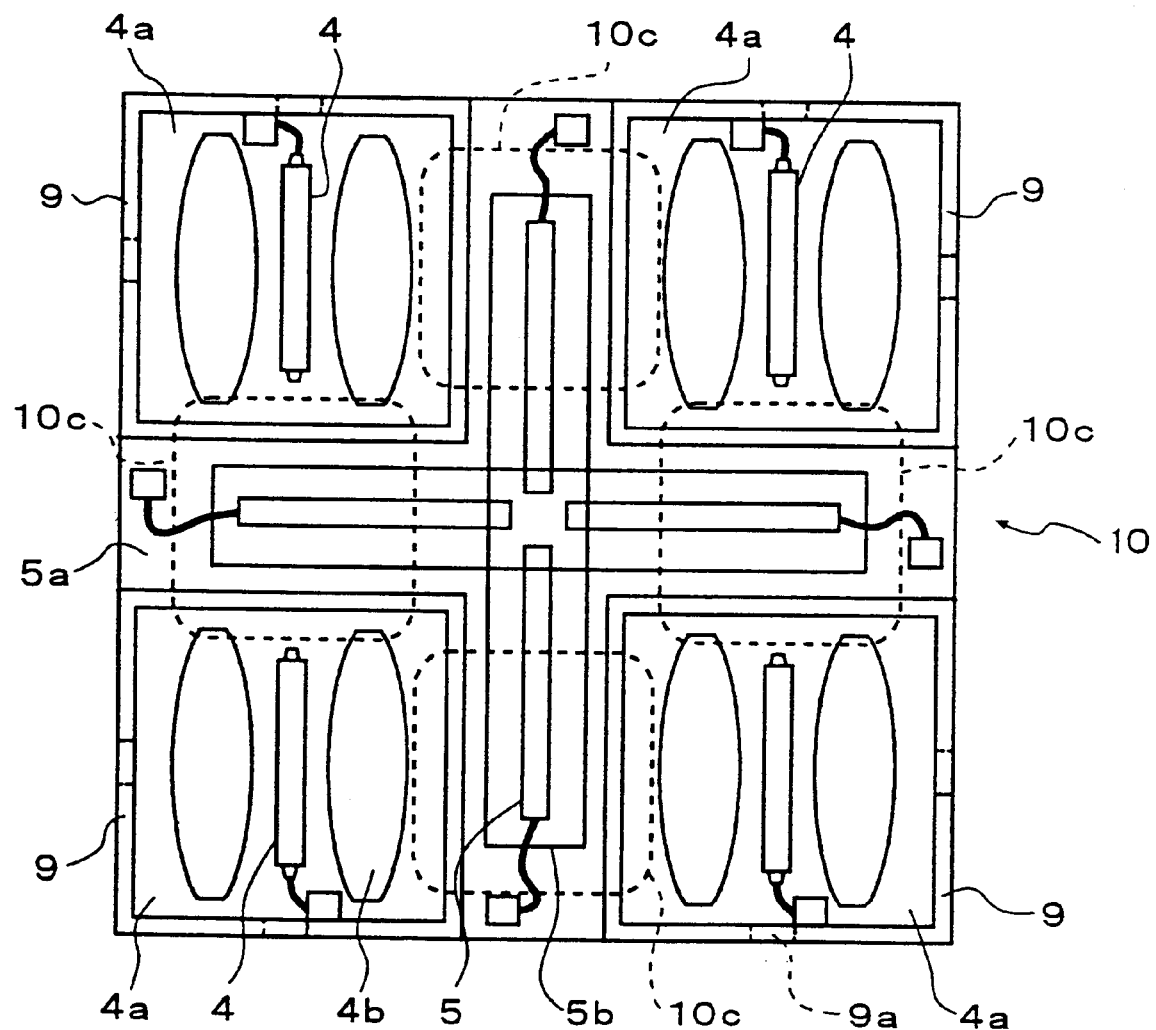
FIG. 3 is a bottom view showing a holding plate of a repair apparatus for a vehicle according to an embodiment of the present invention.
Figure 4:
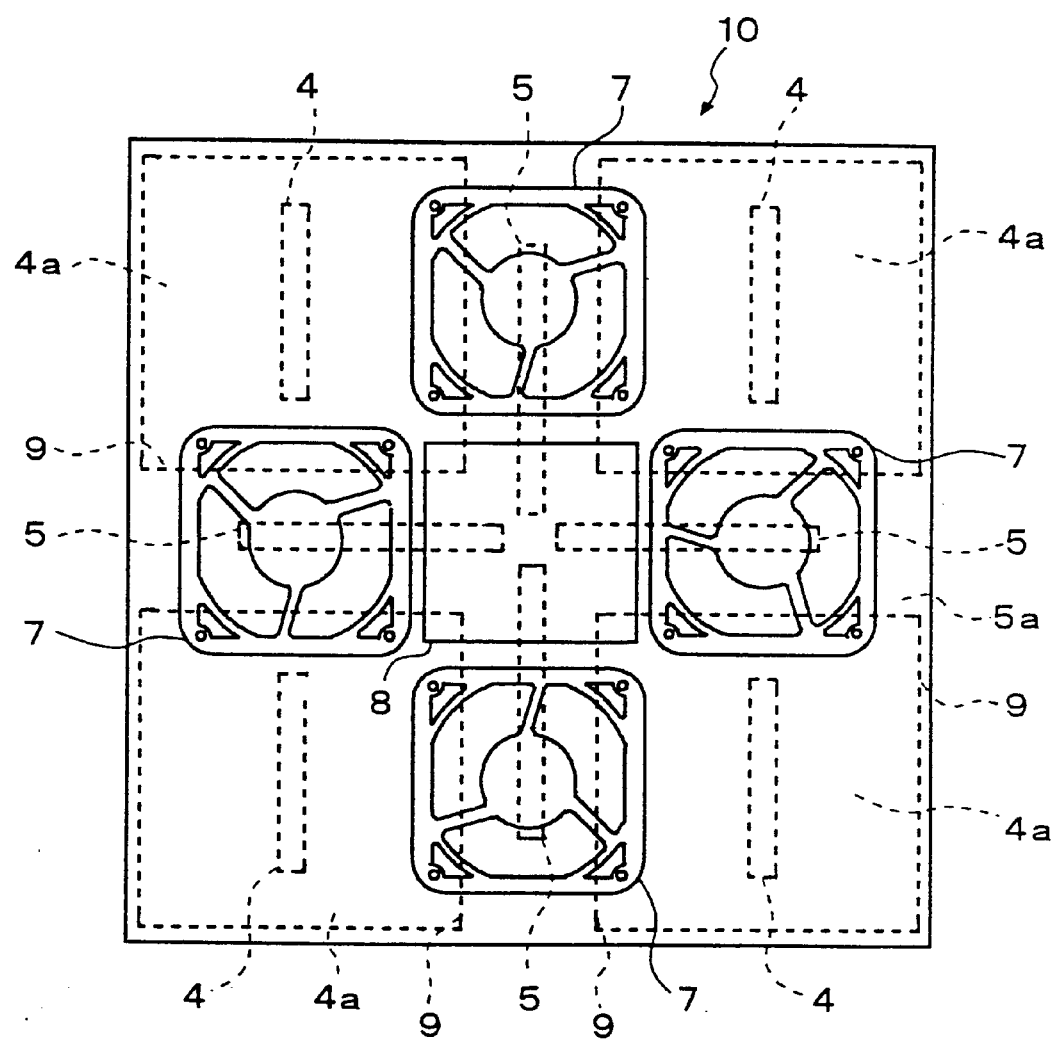
FIG. 4 is a top view showing the holding plate of shown in FIG. 3.

Hereinafter, the repair apparatus for a vehicle of the present invention will be described in detail with reference to FIGS. 1 to 13.

First, referring to FIGS. 1 to 4, the construction of an irradiation device body 100 is illustrated. The irradiation device body 100 includes a box 3 having an opening 3a, an ultraviolet rays irradiation device 4 having an irradiation unit 4a that is provided inside the box 3 to irradiate ultraviolet rays, an infrared rays irradiation device 5 having an irradiation unit 5a that is provided inside the box 3 to irradiate infrared rays, and a blower 7 that is arranged in the box 3 to cool the irradiation unit 4a for irradiating ultraviolet rays and blast the air warmed at the irradiation unit 5a for irradiating infrared rays to the side of the opening 3a of the box 3.

The box 3 is made of a top board 1 and a sidewall section 2 which are formed of aluminium, and is provided with an opening 3a on one end. On the inner surface side of the box are formed protrusions and depressions (not shown) by embossing. On an edge 3b of the box 3 positioned at the opening 3a a protective boot 6 is provided, which is elastic. Further, inside the box 3 a holding plate 10 is provided, which is formed in a square form holding the ultraviolet rays irradiation device 4, the infrared rays irradiation device 5, and the blower 7.

On a lower surface 10a of the holding plate 10 a plurality of infrared rays irradiation units 5a are arranged so as to extend in parallel to and in all directions from a center of the lower surface. Between every two adjacent infrared rays irradiation units 5a, there is provided one ultraviolet rays irradiation unit 4a so as to extend in parallel to the lower surface 10a. That is, the infrared rays irradiation units 5a are provided in the form of a cross (or letter X) in the center of the holding plate 10 and ultraviolet rays irradiation units 4a are arranged near four corners of the holding plate 10, respectively. On the lower surface 10a of the holding plate 10, a diaphragm 9 is provided to partition the respective irradiation units 4a and 5a (cf., FIG. 3).

In the infrared rays irradiation units 5a, four medium infrared ray sheathed heater having an irradiation spectrum of a wavelength in the range of 2 to 8 $\mu$m is formed in a form of a cross as the infrared rays irradiation device 5. The irradiation spectrum of the infrared rays irradiation apparatus 5 used in the present embodiment corresponds to the absorption spectrum of generally used paints and more specifically, to the irradiation spectrum suitably absorbed by paints containing resins such as methyl methacrylate resins, epoxy resins, phenol resins, urea resins, melamine resins and so forth. The above-mentioned irradiation spectrum is not limited to the above range but may be optionally varied depending on changes in the paint or the like. Hereinafter, the infrared rays irradiation device 5 is referred to as IR heater 5.

The ultraviolet rays irradiation units 4a are provided with 4-kw metal halide lamps of instantaneously lighting type having a spectral energy peak at a wavelength of near 410 nm as the ultraviolet rays irradiation device 4. The spectral energy peak of the ultraviolet rays irradiation device 5 used in the present embodiment may be optionally varied depending on changes in the ultraviolet ray polymerizable composition to be filled onto the target surface to be repaired. Hereinafter, the ultraviolet rays irradiation device 4 is referred to as UV lamp 4.

The both irradiation devices 4 and 5 are each provided with reflecting plates 4b and 5b for directing the respective irradiation beams to the side of the opening 3a of the box 3. The protrusions and depressions (not shown) provided on the inner surface side of the box 3 reflect diffusely the lights reflected by the respective reflecting plates 4b and 5b to enable uniform irradiation of light onto the repair work surface. The above-mentioned protecting boot 6 provided at the opening 3a can be extended so as to contact the periphery of the repair work surface or come close thereto so that the irradiated beams from the respective irradiation devices 4 and 5 can be irradiated without any leakage to the outside. Therefore, the operator can be protected from ultraviolet rays and any damages of the vehicle upon an unexpected contact of the box 3 with the vehicle can be prevented. More efficient irradiation can be made by providing a reflecting material on the inner surface of the protecting boot 6.

The numbers and arrangements of the respective irradiation devices 4 and 5 may be optionally designed. For example, one UV lamp 4 may be provided in the center of the lower surface of the holding plate 10 and at the same time four IR heaters 5 may be provided in parallel to the UV lamp 4. Not only the protecting boot 6 but also the body of the box 3 itself may be elastic. For example, the sidewall section 2 may be made of an independent double wall structure such that one side wall section can be drawn out of the other side wall section telescopically.

The diaphragm 9 provided on a lower surface 10a of the holding plate 10 is arranged to surround the UV lamp 4. The diaphragm 9 protects the UV lamp 4 from the heat generated by the IR heater 5. Further, along the periphery of the diaphragm 9 is attached a protecting glass 9b so as to cover the ultraviolet rays irradiation units 4a to isolate the ultraviolet rays irradiation units 4a from the infrared rays irradiation units 5a.

The protecting glass 9b prevents fragments of the UV lamp 4 from scattering in every direction when it is broken or other occasions. The protecting glass 9b uses silica glass having high ultraviolet transmittance. Also, heat resistant (heat resistant) glass or a laminate glass composed of a heat resistant (heat resistant) glass and a reinforcing (tempered) glass may be used.

On the other hand, there are provided on the upper surface 10b of the holding plate 10 four blowers 7 for blowing air to the respective irradiation devices 4 and 5 as well as a terminal box 8 for distributing electricity to the respective irradiation devices 4 and 5 and the blowers 7. The blowers 7 are each arranged just above the corresponding IR heater 5 with the IR heater being in the center thereof and over the adjacent ultraviolet rays irradiation units 4a. That is, the blowers 7 are arranged in the form of letter X with respect to the holding plate 10. Each blower 7 has a large diameter axial flow fan. This contributes to a reduction in weight of the body of the irradiation device 100.

The body of the holding plate 10 is provided with a plurality of airflow ports 10c for introducing the air form the blowers 7 to the respective irradiation units 4a and 5a. The airflow ports 10c are open across the diaphragm 9, so that both the ultraviolet rays irradiation units 4a and the infrared rays irradiation units 5a are supplied with the air.

The blowers 7 and the airflow ports 10c thus provided are to cool the UV lamps 4 to enable their continuous lighting and at the same time to blow the air warmed by the infrared rays irradiation units 5a as hot air onto the repair work surface. The diaphragms 9 are arranged with respect to the airflow ports 10c such that the airflow ports 10c have larger opening areas on the side of the infrared rays irradiation units 5a than on the side of the ultraviolet rays irradiation units 4a. As a result, most of the air sent from the blowers 7 is blasted on the side of infrared rays irradiation units 5a.

On the other hand, the sidewall section 2 is provided with discharge outlets 2a and the diaphragms 9 along the sidewall section 2 are provided with discharge outlets 9a. The discharge outlets 2a and 9a communicate with each other. These outlets are provided so that the air inside the ultraviolet rays irradiation units 4a isolated by the diaphragms 9 and the protecting glass 9b can be discharged to the outside.

The protecting boot 6 provided on the box 3 are provided with a plurality of airflow ports 6a. The airflow ports 6a are provided in order to smoothly discharge the air inside the box 3 when the box is used close around the repair work surface, that is, in a state where the protecting boot 6 is in a position close to a vehicle. As a result, the air supplied from the blowers 7 flows in a sequence of airflow ports 10c→infrared rays irradiation units 5a→repair work surface→airflow ports 6a→open air, and airflow ports 10c→ultraviolet rays irradiation units 4a→discharge orifices 9a→discharge orifices 2a→open air. The diameter of the airflow ports 6 is set to a dimension such that no ultraviolet ray can be leaked to the outside.

The numbers of the blowers 7 and of airflow ports 10c in the holding plate 10 may be optionally set up. For example, a small blower dedicated to cooling only may be provided just above each UV lamp 4 and a large blower dedicated to blowing only may be provided just above each IR heater 5.

Blowing nozzles may be provided to the airflow ports 10c in order to more securely supply air to the respective irradiation units 4 and 5. Light shielding louvers for protecting the blowers 7 from ultraviolet rays may be provided at the airflow ports 10c that face the ultraviolet rays irradiation units 4a.

Figure 8:
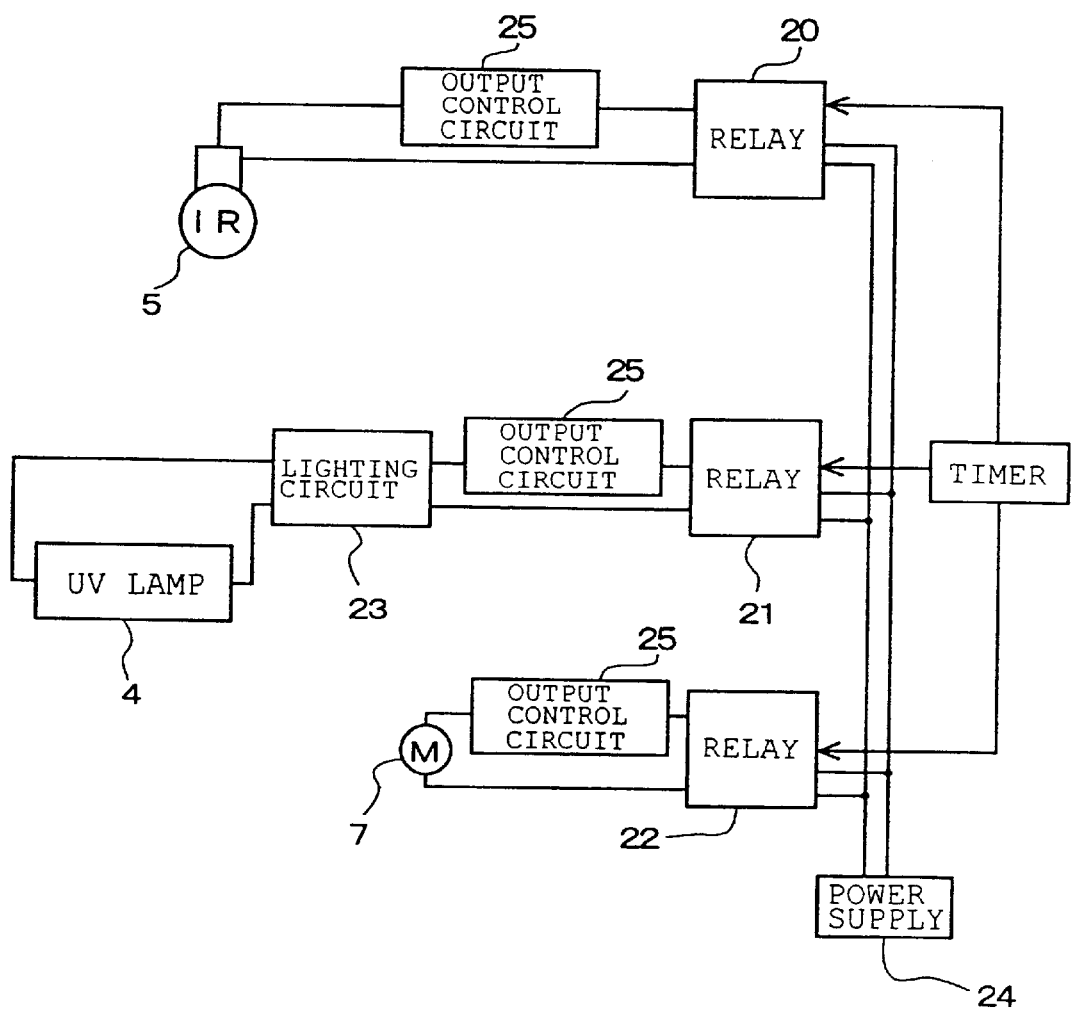
FIG. 8 is a diagram showing a circuit used in a repair apparatus according to an embodiment of the present invention.

FIG. 8 is a diagram illustrating a circuit relative to the control means (control device) of the repair apparatus for a vehicle of the present embodiment. The control device includes a power supply 24, a lighting circuit 23 for the UV lamps 4, a plurality of real time relays (relays performing on/off of electric contacts based on predetermined time) 20, 21 and 22, and a plurality of output control circuits 25 for controlling the outputs of the respective devices 4, 5 and 7. The UV lamps 4 are connected to the lighting circuit 23 constituted by a driver having a high frequency, which in turn is connected to the power supply 24 through the power control circuit 25 and the real time relay 21. The IR heaters 5 are connected to the power supply 24 through the output control circuit 25 and the real time relay 20. Also, the blowers 7 are connected to the power supply 24 through the output control circuit 25 and the real time relay 22. As a result, the UV lamps 4, the IR heaters 5, and the blowers 7 can be individually controlled.

Figure 9:
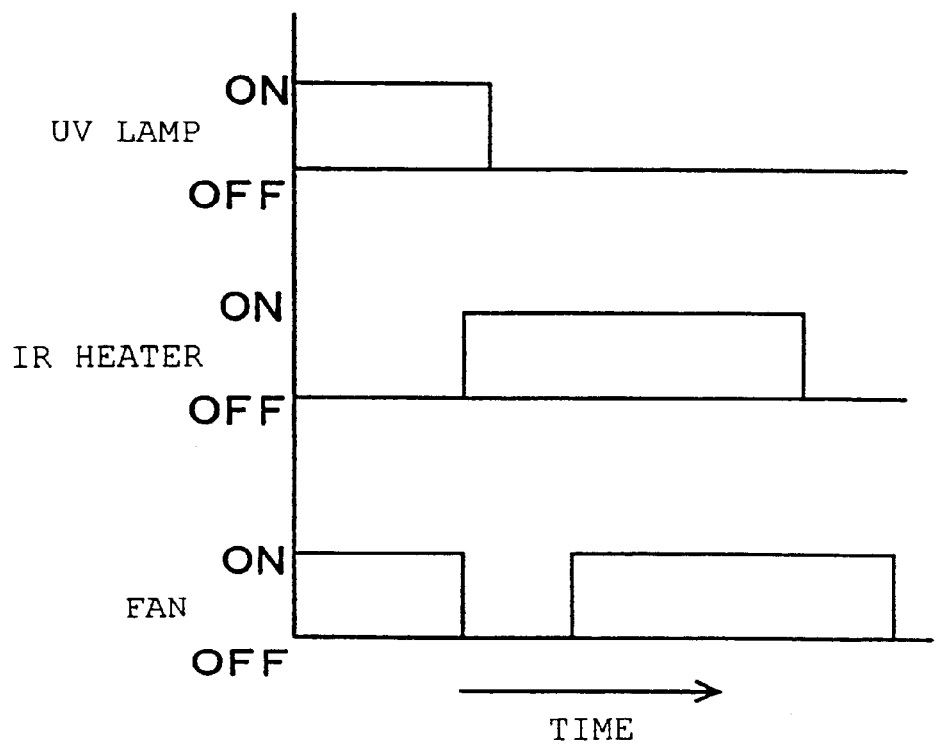
FIG. 9 is a graph illustrating control of a repair apparatus according to an embodiment of the present invention.

For example, when putty containing an ultraviolet curing resin is to be cured, the control may be performed as follows (cf. FIGS. 8 and 9).

First, the UV lamps 4 are turned on and the blowers 7 are activated. At the same time, the respective real time relays 20, 21 and 22 start counting. When a predetermined time set for the real time relay 22 connected to the blowers 7 is reached the real time relay 22 opens the contact to stop the blowers 7. At this point in time, a predetermined time set for the real time relay 20 connected to the IR heaters 5 is also reached and the real time relay 20 closes the contact 20 to activate the IR heaters 5.

Next, when a predetermined time set for the real time relay 21 connected to the UV lamps 4 is reached, the real time relay 21 opens the contact to turn off the UV lamps 4. At this point in time, a predetermined time set for the real time relay 22 connected to the blowers 7 is also reached and the relay 22 closes the contact to activate the blowers 7 again.

Subsequently, a predetermined time set for the real time relay 20 connected to the IR heaters 5 is reached the real time relay 20 opens the contact to turn off the IR heaters 5. When a predetermined time set for the real time relay 22 connected to the blowers 7 is reached, the real time relay 22 opens the contact to stop the blowers 7.

In this control, first the UV lamps 4 are turned on to induce the chemical reaction of the ultraviolet curing resin and at the same time actuate the blowers 7 to prevent an abrupt increase in temperature of the UV lamps 4. Then, the solvent contained in the putty is evaporated by the infrared rays from the IR heaters 5 and the hot air from the blowers 7. On this occasion, since it takes a certain time for the IR heaters 5 to generate infrared rays (heat beam) having a predetermined intensity, the IR heaters 5 are activated prior to the turn off of the UV lamps 4. The blowers 7 are activated with a delay from the activation of the IR heaters 5 so that the warming up of the IR heaters 5 cannot be prevented. Further, the blowers 7 are stopped several seconds later than the turn off of the IR heaters 5 to enable the cooling of the IR heaters 5.

Then, explanation will be made on examples of output control of the IR heaters 5 and of the blowers 7 by the output control circuits 25 connected to the IR heaters 5 and the blowers 7, respectively, with respect to drying of a primer-surfacer and a paint (pigment) coated after the curing of the putty When drying any coating film, first drying of the inside of the coating film is performed by retaining outputs of the IR heaters 5 and the blowers 7 at low levels such that the flexibility of the surface of the coating film is not lost. Subsequently, after maintaining that state for several seconds to several minutes, the outputs of the IR heaters 5 and blowers 7 are increased to effect the drying of the surface of the coating film.

Here, in relation to the output control, ideal drying mechanism of coated surface will be briefly explained. In order to efficiently dry the coated surface, first it is necessary to maintain the flexibility of the coated surface immediately after the coating. This is to prevent the surface of the coating film from losing breathing property according as the curing of the coating film surface proceeds to thereby prevent the solvent in the paint (in the coating film) from becoming difficult to evaporate. For this purpose, in the output control immediately after the coating described above, the outputs of the IR heaters 5 and of the blowers 7 are decreased and the vapor pressure inside the coating film is increased mainly by the radiation energy from the IR heaters 5 to accelerate the evaporation of the solvent from inside of the paint.

Subsequently, after the solvent in the paint has been evaporated substantially, the temperature of the entire paint is increased and at the same time the surface of the coating film is dried by the hot air. This is performed in order to accelerate the chemical reaction of the resin materials contained in the paint to proceed at high rates to increase the rate of polymerization of the resin material while curing the surface of the coating film in a flexible state to completely dry the entire paint. Thus, in the above-mentioned output control, the outputs of the IR heaters 5 and of blowers 7 are increased so that the chemical reaction inside of the coating film can be accelerated to higher rates due to the radiation energy from the IR heaters 5 and at the same time the surface of the coating film can be cured by the hot air supplied to the surface of the coating film from the blowers 7.

In the example of output control according to the present embodiment, the infrared rays irradiation output and the amount of air (output) from the blowers are controlled appropriately. Upon controlling the outputs, the outputs of the devices may be increased or decreased or the number of activated devices may be increased or decreased to control the output (illumination).

As described above, the irradiation devices 4 and 5 and the blowers 7 can be controlled appropriately so that the working time of coated surface repair work can be greatly shortened as compared with the conventional coated surface repair work. Needless to say, the control pattern may be set optionally.

As the ultraviolet polymerizable composition used as a material for putty, those compositions similar to ultraviolet polymerizable compositions used as materials for putty for automobiles may be used without any particular limitation. Ultraviolet polymerizable composition used as such a material for a putty contains an ultraviolet polymerizable prepolymer, an ultraviolet polymerizable monomer, and an ultraviolet polymerization initiator as essential components and a sensitizer, a pigment, a filler, a defoamer, a surface improver, a solvent and so forth as optional components.

The ultraviolet polymerizable prepolymer contained in the above-mentioned ultraviolet polymerizable composition specifically includes: radical polymerizing type prepolymers, for example, ester acrylates, urethane acrylates, epoxy acrylates, amino resin acrylates, acrylic resin acrylates, unsaturated polyesters, etc.; cation polymerizing type prepolymers, for example, epoxy resins, vinyl ether containing resins, etc.; and thiol/ene adduct type prepolymers obtained by combining an oligomer having an aryl group or an acryloyl group at the terminal of the molecule with a polythiol.

The ultraviolet polymerizing monomer specifically includes radical monomers such as 2-ethylhexyl acrylate, ethoxydiethylene glycol acrylate, phenoxyethyl acrylate, 2-hydroxypropyl acrylate, tetrahydrofurfuryl acrylate, dicyclopentenyl acrylate, neopentyl glycol diacrylate, polyethylene glycol diacrylate, bis(acryloxyethyl) bisphenol A, trimethylolpropane acrylate, pentaerythritol acrylate, and dipentaerythritol hexaacrylate; cationic monomers such as vinylcyclohexene monoxide, hydroxybutyl vinyl ether, cyclohexanedimethanol divinyl ether, cyclohexene diepoxide, and caprolactone polyol and so forth.

The ultraviolet polymerization initiator specifically includes various carbonyl compounds as radical polymerization type initiators and onium salts as cationic polymerization initiators, and so forth. The initiator for thiol/ene adduct type prepolymers includes hydrogen eliminating type initiators.

The ultraviolet polymerizable composition for a material for putty can be prepared, for example, by compounding the necessary components in appropriate ratios and optionally the optional components in appropriate amounts as needed. The blending amounts of the various components may be optionally selected depending on the kinds of the essential components to be used.

As the ultraviolet polymerizable composition for a material for a putty, an ultraviolet polymerizable composition containing about 20% to about 30% by weight of an ultraviolet polymerizable prepolymer, about 15% to about 30% by weight of an ultraviolet polymerizable monomer, about 1% to about 10% by weight of an ultraviolet polymerization initiator, about 40% to about 60% by weight of a pigment based on the total amount of the composition is preferred. The pigment used in the above-mentioned ultraviolet polymerizable composition is not particularly limited as far as it is a pigment but generally extender pigments such as calcium carbonate, barium sulfate, clay, talc, polishing powder, white carbon, and balloon are preferred. After completion of filling such a putty material, the filled portion is irradiated with ultraviolet rays by the body of each irradiation device to cure the putty material composed of the ultraviolet polymerizable composition.

As described above, ultraviolet rays and infrared rays from the body of irradiation apparatus 100 are irradiated to the repair work surface and at the same time the hot air warmed by the infrared rays are supplied to the repair work surface to cure the putty. After curing the putty, a volatile or ultraviolet curing primer-surfacer is coated on the putty. When a volatile one is used, the infrared rays from the IR heaters 5 are directly applied to the coated surface and the hot air warmed by the infrared rays irradiation units 5a is supplied to the coated surface to dry it. When an ultraviolet curing type one is used, it is cured by the UV lamps 4 in a manner similar to the case of the putty. After drying the primer-surfacer, a volatile paint is coated and the infrared rays from the IR heaters 5 are applied to the coated surface and at the same time the hot air warmed by the IR heaters 5 is supplied to the coated surface to dry the paint.

The above explanation is related to the body of irradiation device 100 for a repair apparatus for a vehicle of the present invention. As explained above, when ultraviolet rays and infrared rays are irradiated by a single apparatus, supply of the air warmed by the infrared rays to the repair work surface can assist the coated surface repair operation. In the repair apparatus for a vehicle of the present invention, a support rack 13 for supporting the body of irradiation device 100 is provided. Hereinafter, the support rack 13 for supporting the body of irradiation device 100 will be explained in detail.

Figure 5:
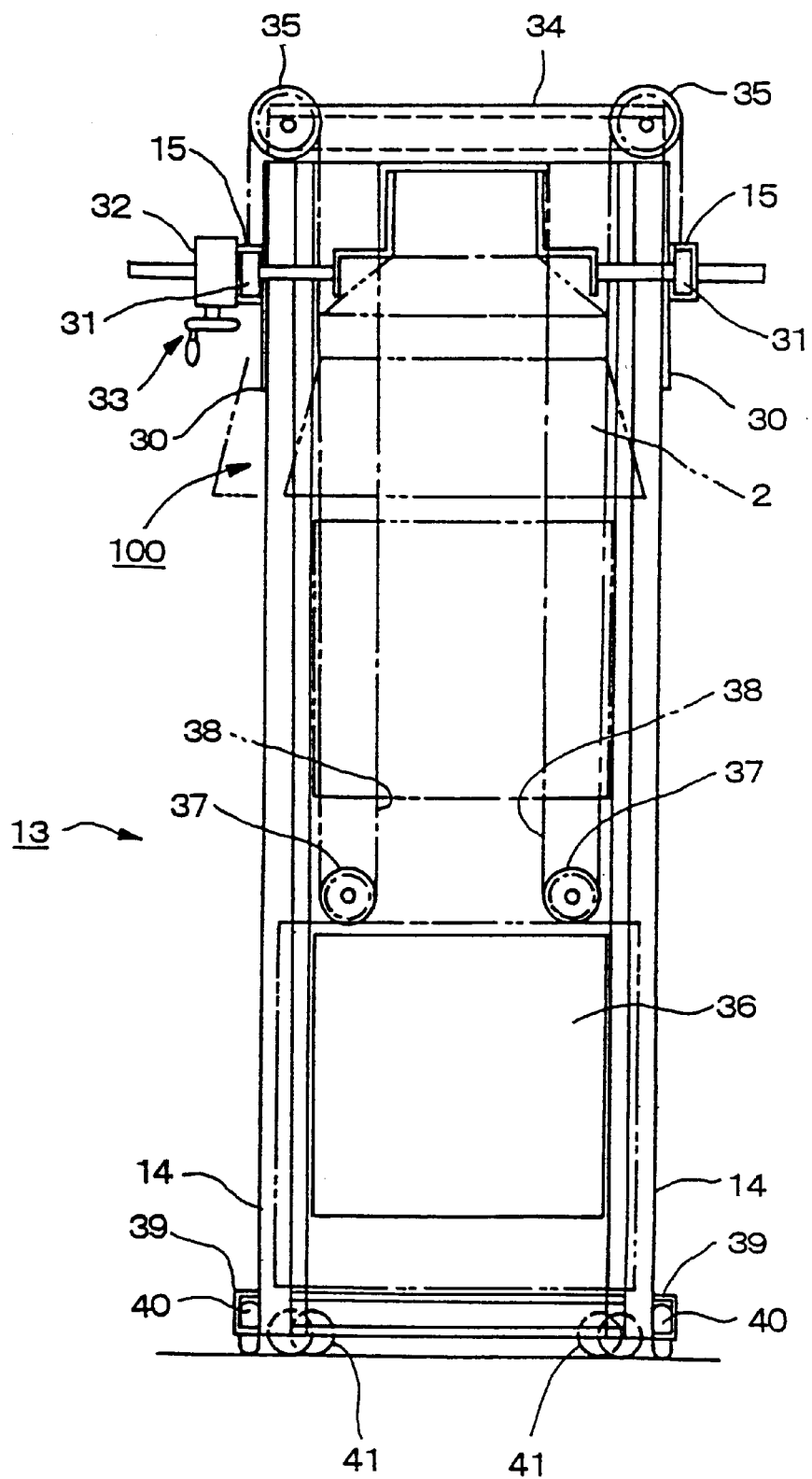
FIG. 5 is a front elevational view showing a repair apparatus for a vehicle according to an embodiment of the present invention in a state where it is supported by a support rack.
Figure 6:
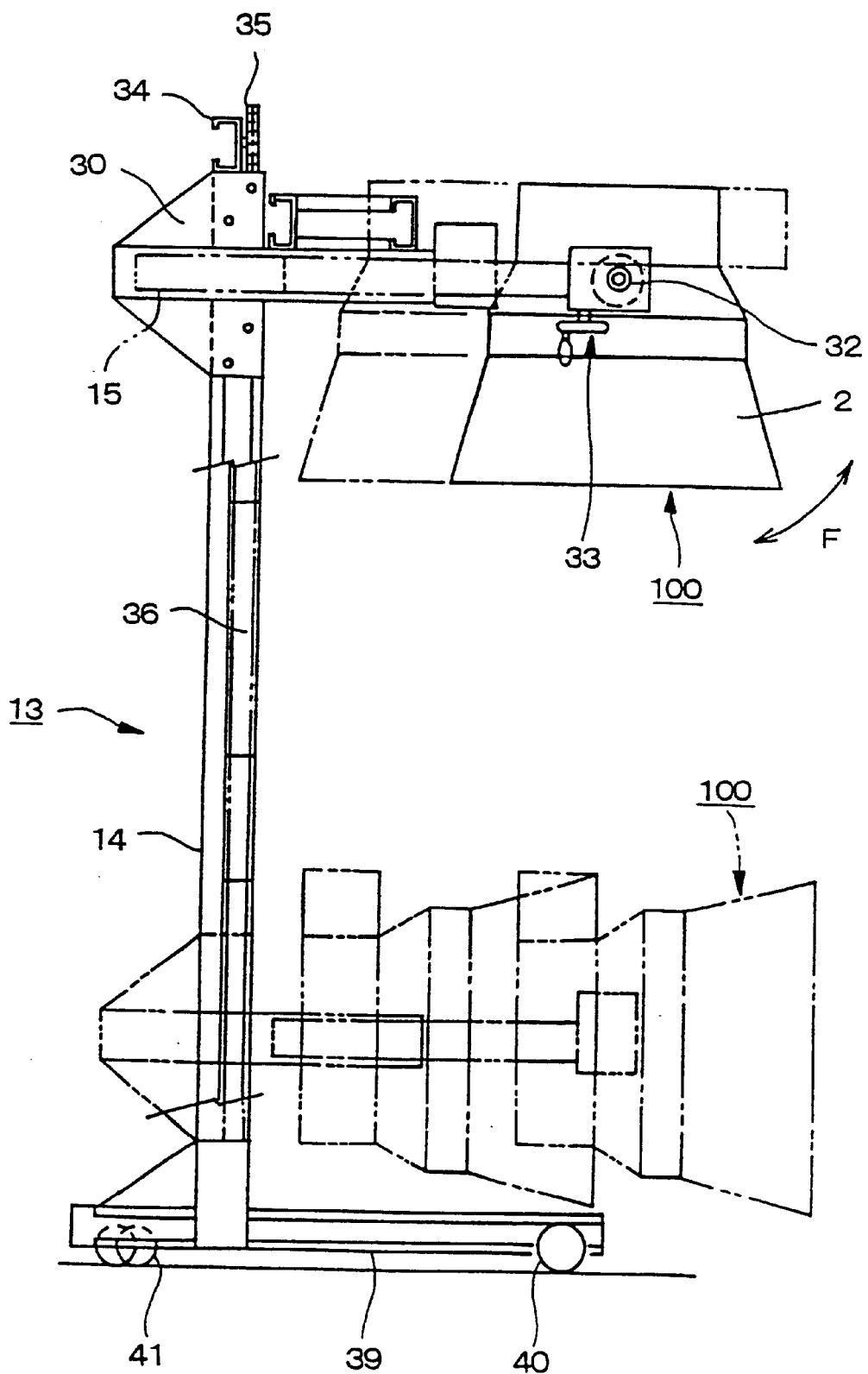
FIG. 6 is a side elevational view showing the repair apparatus of FIG. 5.
Figure 7:
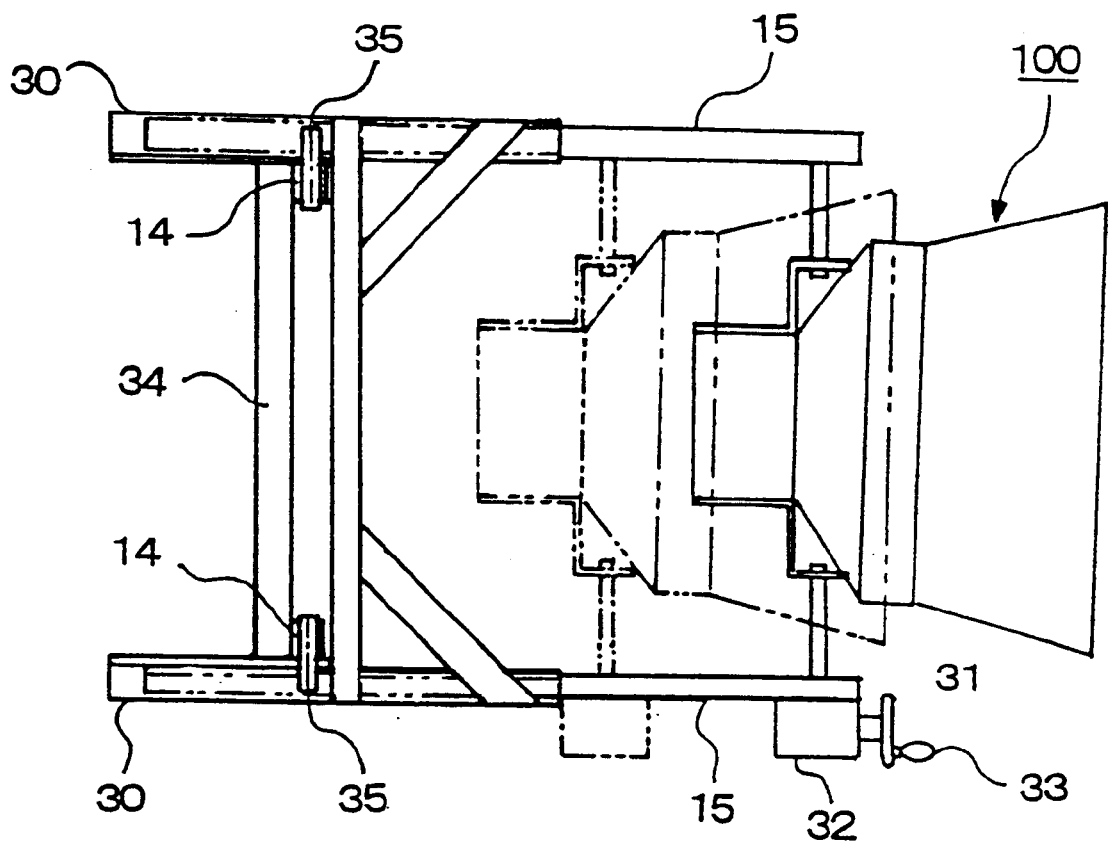
FIG. 7 is a plan view showing the repair apparatus of FIG. 5.

FIGS. 5 to 7 shows an embodiment of a repair apparatus for a vehicle provided with the support rack 13 for supporting the body of irradiation device 100. The support rack 13 facilitates adaptation of the body of irradiation device 100 to the repair work surface. That is, it can support the body of irradiation device 100 at an optional height or in an optional direction.

The support rack 13 includes a longitudinal frame 14 composed of two steel members and a transverse frame 15 slidably held to the longitudinal frame 14. The transverse frame 15 swingably supports the box 3. That is, the two C steel members constituting the longitudinal frame 14 is provided with brackets 30 that are slidable up and down along the steel members. The brackets hold the transverse frame 15 that is slidable in a horizontal direction.

A shaft 31 having formed a large diameter portion on each end thereof is slidably engaged with the C steel members constituting the transverse frame 15. A locator 32 is attached to the shaft 31 to rotate it. The locator 32 is provided with a handle 33. Rotation of the handle 33 rotates a worm gear (not shown) in the locator 32 to rotate the shaft 31. Since the shaft 31 supports the body of irradiation device 100, rotation of the handle 33 can swing the body of irradiation device 100 freely in the direction indicated by an arrow F.

The upper ends of the longitudinal frame 14 are connected to each other through a top frame 34. The top frame 34 is provided with pulleys 35. On the other hand, the longitudinal frame 14 is slidably provided with a ballast 36. The ballast 36 is provided with pulleys 37 and wires 38 are affixed to the pulleys 37, respectively. The wires 38 are extended over the top frame 34, the pulleys 37, the pulleys 35, and the transverse frame 15 in order and balance the weight of the transverse frame 15 and the ballast 36. Therefore, the transverse frame 15, that is, the body of irradiation device 100 can be readily moved up and down.

The arrangements of the pulleys 37 (mobile) and the pulleys 35 (fixed) give rise to a magnification action so that the weight of the whole structure of the transverse frame 15 is half (½ time) the weight of the ballast 36. This makes it possible to make the slide stroke of the whole structure of the transverse frame 15 larger than without the provision of the ballast 36.

Figure 10:
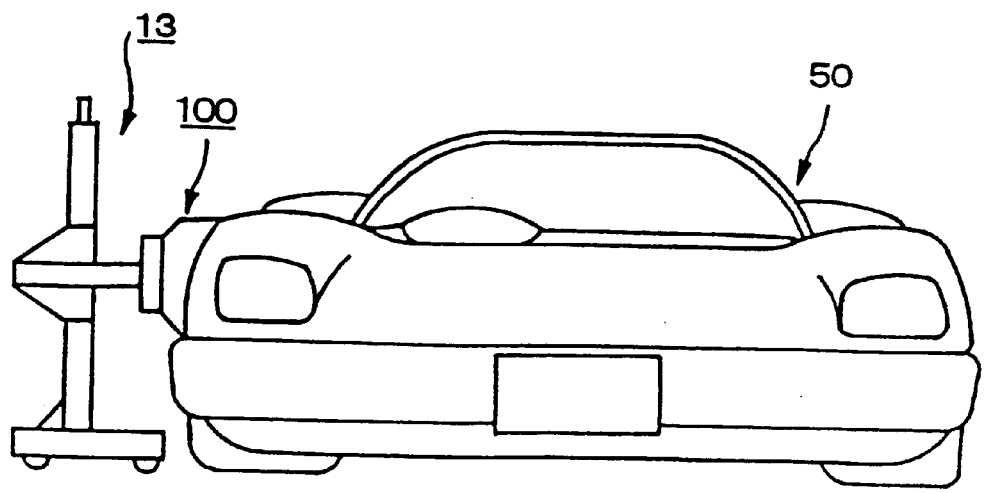
FIG. 10 is a front elevational view showing a repair apparatus for a vehicle according to an embodiment of the present invention in a state where it is used for coating and repairing a vehicle.

To the lower end of the longitudinal frame 14 is connected a bottom frame 39. The bottom frame 39 is provided with fixed tires 40 and swivel casters 41. Because of the fixed tires 40 and the swivel casters 41, the apparatus of the present invention can be moved freely in a repair plant. As shown in FIG. 10, the apparatus of the present invention can be applied to a repair work surface of a vehicle 50 is effectively.

By using the repair apparatus for a vehicle of the present invention as described above, irradiation of ultraviolet rays and infrared rays to the repair work surface of the vehicle 50 becomes extremely easy to increase working efficiency.

Hereinafter, putty curing tests and primer-surfacer curing (drying) tests using the repair apparatus for a vehicle of the present invention will be described.

TEST EXAMPLE 1

Using the body of irradiation device 100 described above, the following preliminary tests (putty curing tests) were performed in order to understand the effects of a protecting glass on the curing of putty, effects of ultraviolet irradiation distance on the curing of putty and effects of the irradiation method and irradiation intensity of the ultraviolet rays irradiation device.

Test Conditions

Using protecting glass composed of heat resistant glass of a thickness of 3 mm, and protecting glass composed of a laminate of heat resistant glass of a thickness of 3 mm and tempered glass of a thickness of 5 mm as samples, the putty curing depth of each sample was measured. In addition, the putty curing depth was measured with setting the distance between the target irradiation surface and the body of irradiation device to 300 mm or 500 mm. The irradiation method was an inversion method or an instantaneous lighting method, and for each case, the putty curing depth was measured. The irradiation intensity was set to maximum output or 70% output and for each case, the putty curing depth was measured. The target irradiation surface was within an area of 600 mm×600 mm and measured at 49 points (equidistantly located).

Test Method

Upon measurement of the putty curing depth, the following eight trial runs were performed.

Trial Run No. 1: Irradiation method: inversion method, irradiation distance: 500 mm, irradiation time period: 90 seconds, glass: heat resistant glass.

Trial Run No. 2: Irradiation method: inversion method, irradiation distance: 300 mm, irradiation time period: 90 seconds, glass: heat resistant glass.

Trial Run No. 3: Irradiation method: inversion method, irradiation distance: 300 mm, irradiation time period: 45 seconds, glass: heat resistant glass.

Trial Run No. 4: Irradiation method: instantaneous lighting method, irradiation distance: 500 mm, irradiation time period: 90 seconds, glass: heat resistant glass+tempered glass.

Trial Run No. 5: Irradiation method: instantaneous lighting method, irradiation distance: 300 mm, irradiation time period: 90 seconds, glass: heat resistant glass+tempered glass.

Trial Run No. 6: Irradiation method: instantaneous lighting method, irradiation distance: 300 mm, irradiation time period: 45 seconds, glass: heat resistant glass+tempered glass.

Trial Run No. 7: Irradiation method: instantaneous lighting method, irradiation distance: 300 mm, irradiation time period: 90 seconds, glass: heat resistant glass.

Trial Run No. 8: Irradiation method: instantaneous lighting method (70% output), irradiation distance: 300 mm, irradiation time period: 90 seconds, glass: heat resistant glass.

Test Results

FIG. 12 shows the results of measurement on Trial Run Nos. 1 to 8. The measured values at each measurement point (total 49 points) are represented by average values shown in FIG. 11.

From Trial Run Nos. 5 and 7, the effects of glass material on the putty curing depth can be understood. Comparison of the results of both trial runs with each other indicated that in the case of the protecting glass using tempered glass, some slight stickiness remained on the surface of the putty but the value of curing depth was substantially equivalent to that obtained in the case of heat resistant glass. Accordingly, it can be said that the protecting glass is preferably heat resistant glass but tempered glass can also be used.

From Trial Run Nos. 2 and 7, the effects of irradiation method on the putty curing depth can be understood. Comparison of the results of both trial runs with each other revealed that substantially equivalent values of curing were obtained regardless of whether an inversion method or an instantaneous lighting method was used as the irradiation method. That is, it can be said that the ultraviolet rays irradiation method may be either an inversion method or an instantaneous lighting method.

From Trial Run Nos. 1 and 2 as well as Trial Run Nos. 4 and 5, the effects of ultraviolet rays irradiation distance on the putty curing depth can be understood. From the comparison of the results of both trial runs with each other, there appeared no substantial difference between them. That is, it can be said that as far as the irradiation distance in the range of 300 mm to 500 mm is concerned, the irradiation distance gives no substantial effect on the putty curing depth.

From Trial Run Nos. 7 and 8, the effects of irradiation intensity on the putty curing depth can be understood. Comparing the results of both trial runs with each other, it appeared that the putty curing depth at an irradiation intensity of 70% output was slightly smaller than the putty curing depth at 100% output. However, the ratio of decrease is only about 5% so that it can be said that if the irradiation intensity is decreased to 70%, the putty can be cured satisfactorily.

From Trial Run Nos. 2 and 3, the effects of irradiation time period on the putty curing depth can be understood. Comparison of the results of both trial runs with each other revealed that 45 seconds' irradiation gave a putty curing depth smaller than that given by 90 seconds' irradiation. However, 45 seconds' irradiation could give about 85% of the putty curing depth obtained by 90 seconds' irradiation. That is, it can be said that the curing of putty proceeds proportional to the irradiation time period but at the point in time when about half the predetermined time elapsed, the putty is mostly cured.

In actual repair operations, ultraviolet rays are irradiated with a distance of about 250 mm from the coating repair work surface and the irradiation time period is set to about 60 seconds to about 90 seconds. This improves the curing state of putty and most of general repair work can be performed securely.

The putty is cured as described above and the damaged portion optionally subjected to pretreatment is filled with the putty. Here, if the volume of the putty material is decreased to some extent when it is cured, the protuberatance of putty may sometimes be decreased to some extent as compared with that before the curing.

TEST EXAMPLE 2

To understand the effects as to whether or not blowers are used in combination, of infrared irradiation time period, and of the kind of the solvent contained in the primer-surfacer on the solvent removal ratio of the primer-surfacer, the following preliminary tests (primer-surfacer solvent removal tests) were simultaneously performed.

Test Method

Figure 11:
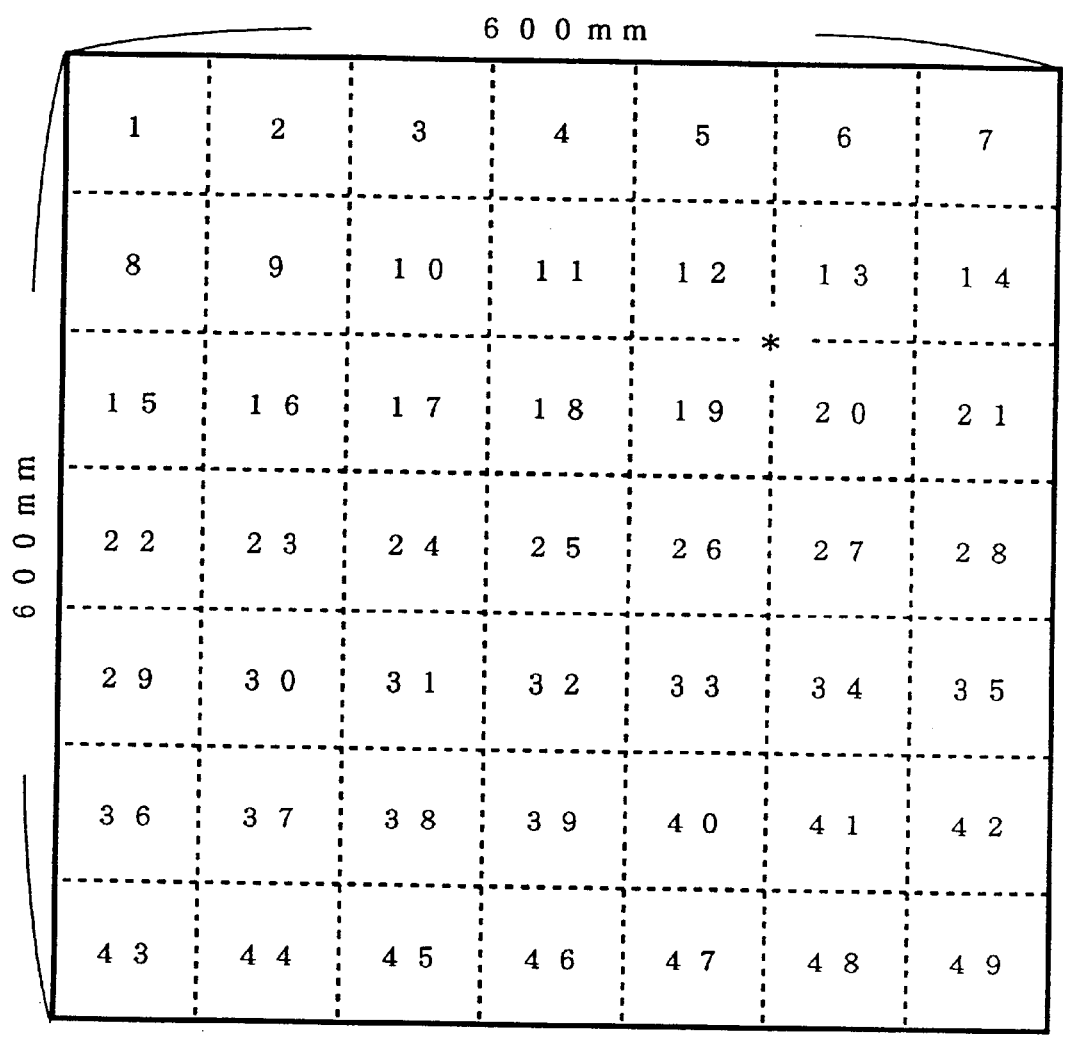
FIG. 11 is a diagram illustrating distribution of measurement points shown in FIGS. 12 and 13.

On the same target irradiation surface as in Test Example 1 (600 mm×600 mm) were coated primer-surfacers containing various solvents. Thereafter, using the body of irradiation device 100, medium infrared rays were irradiated thereon. At four positions (located at an equivalent distance), solvent removal ratio was measured (cf. FIG. 11 illustrating corresponding measurement points for the measurement points). As the solvent, xylene or toluene was used. The content of solvent in the primer-surfacer was 1 g/cm$^2$. The blowers 7 were activated 1 minute after the start of the operation of the IR heaters and stopped simultaneously with the stop of the IR heaters.

Trial Run Conditions

Upon measurement of solvent removal ratios, the following four trial runs were performed.

Trial Run No. 1: Solvent: xylene, infrared rays irradiation time period: 2 minutes, and fan actuation time period: 1 minute.

Trial Run No. 2: Solvent: xylene, infrared rays irradiation time period: 3 minutes, and fan actuation time period: 2 minutes.

Trial Run No. 3: Solvent: xylene, infrared rays irradiation time period: 2 minutes, and fan actuation time period: 0 minute (i.e., no fan was used in combination).

Trial Run No. 4: Solvent: toluene, infrared rays irradiation time period: 2 minutes, and fan actuation time period: 1 minute.

The amount of the solvent used in Test Example 2 above corresponded to the coating film having a thickness of 200 to 300 $\mu$m, which was considerably thick as the primer-surfacer coating.

Test Results

The results of Trial Run Nos. 1 to 4 are shown in FIG. 13.

From Trial Run Nos. 1 and 3, the effects as to whether or not blowers are used on the solvent removal ratio can be understood. Comparison of the results of both trial runs with each other revealed that the solvent removal ratio of when using blowers in combination was much greater than the solvent removal ratio when using no blower. That is, combined use of blowers when IR heaters are activated enables curing (drying) of primer-surfacer in a shorter time period.

From Trial Run Nos. 1 and 2 revealed that the effects of irradiation time period on the solvent removal ratio can be understood. Comparison of the results of both trial runs with each other, 2 minutes' irradiation the solvent removal ratio was slightly decreased but a solvent removal ratio of 75% or more can be obtained. That is, it can be said that while the solvent removal ratio of primer-surfacer is increased proportional to the irradiation time period, the putty is almost dried at the point in time where about half the predetermined time has elapsed.

From Trial Run Nos. 1 and 4, the effects of the kind of solvent on the solvent removal rate can be understood. Comparing the results of both trial runs with each other, it was apparent that the solvent removal ratio for xylene was slightly lower than that for toluene but the rate of decrease remains to be about 10%. That is, it can be said that it is desirable to use toluene as the solvent but xylene can also be used.

The above test results indicate that the repair apparatus for a vehicle of the present invention can exhibit satisfactory curing polymerization acceleration effects on curing of putty containing an ultraviolet polymerizable compound or compounds and curing (drying) of primer-surfacer.

The present invention should not be construed as being limited to the contents of the above-described embodiments but one skilled in the art can make various changes and modifications without departing from the spirits and scope of the present invention as defined by the appended claims.

What is claimed is:

1. A repair apparatus for a vehicle, comprising:
   a box having an opening;
   an ultraviolet irradiation device arranged in the box for emitting ultraviolet rays through the opening onto a surface of the vehicle to be repaired;
   an infrared irradiation device arranged in the box for emitting infrared rays through the opening onto the surface of the vehicle;
   a first blower for cooling the ultraviolet irradiation device; and
   a second blower for sending hot air from the infrared irradiation device through the opening and onto the surface of the vehicle.

2. A repair apparatus according to claim 1, wherein the first blower and the second blower comprise one and the same blower.

3. A repair apparatus according to claim 1, further comprising a control means for individually controlling the ultraviolet irradiation device, the infrared irradiation device, the first blower, and the second blower.

4. A repair apparatus according to claim 1, wherein the box is expandable and shrinkable in a direction along which the radiation from the respective irradiation devices is emitted through the opening.

5. A repair apparatus according to claim 1, wherein at least a portion of the box positioned to engage the surface of the vehicle is elastically flexible so as to generally conform to the surface when pressed thereagainst and thereby form a seal therewith to substantially prevent escape of radiation in unintended directions.

6. A repair apparatus according to claim 1, wherein the box includes vents and is structured and arranged to channel air blown onto the ultraviolet irradiation device out the vents rather than through the opening.

7. A repair apparatus according to claim 1, further comprising a holding plate affixed within the box, the blowers being mounted on a first surface of the holding plate that faces away from the opening, the irradiation devices being mounted on a second surface of the holding plate that faces toward the opening, and the holding plate including air passages therethrough for directing air from each of the blowers onto the respective irradiation devices.

8. A repair apparatus according to claim 7, further comprising a partition arranged on the second surface of the holding plate for partitioning the ultraviolet irradiation device from the infrared irradiation device.

9. A repair apparatus according to claim 8, wherein the ultraviolet irradiation device comprises a plurality of ultraviolet irradiation units each emitting ultraviolet radiation and the infrared irradiation device comprises a plurality of infrared irradiation units each emitting infrared radiation, the partition serving to separate the ultraviolet irradiation units from the infrared irradiation units.

10. A repair apparatus according to claim 9, further comprising glass panels covering the ultraviolet irradiation units and cooperating with the partition to channel air blown onto the ultraviolet irradiation units through vents formed in the box such that said air is exhausted from the box through the vents rather than through the opening.

11. A repair apparatus according to claim 1, further comprising a support rack for holding the box in a desired position and orientation relative to the vehicle to be repaired.

12. A repair apparatus according to claim 11, wherein the support rack comprises a first frame, and a second frame movably supported on the first frame for adjusting position of the box relative to the first frame.

13. A repair apparatus according to claim 12, wherein the first frame is supported on a ground-engaging portion and extends vertically up therefrom and the second frame is arranged to slide up and down along the first frame to adjust positioning of the box, and further comprising a balancing mechanism connected between the first and second frames for facilitating such adjustment of the box.

14. A repair apparatus according to claim 12, wherein the box is pivotally mounted on the second frame for adjusting orientation of the box relative thereto.

* * * * *

UNITED STATES PATENT AND TRADEMARK OFFICE
CERTIFICATE OF CORRECTION

PATENT NO. : 6,617,589 B2
DATED : September 9, 2003
INVENTOR(S) : Ueno

It is certified that error appears in the above-identified patent and that said Letters Patent is hereby corrected as shown below:

<u>Title page,</u>
Item [*] Notice:, should appear as follows,
-- Subject to any disclaimer, the term of this patent is extended or adjusted under 35 U.S.C. 154(b) by 125 days. --.
Item [22], PCT Filed, "Apr. 9, 2001" should read -- Feb. 5, 2001 --.

Signed and Sealed this

Twentieth Day of July, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,617,589 B2
DATED : September 9, 2003
INVENTOR(S) : Makoto Ueno

It is certified that error appears in the above-identified patent and that said Letters Patent is hereby corrected as shown below:

Title page,
Item [*] Notice, delete the phrase "by 0 days" and insert -- by 125 days --
Item [22], PCT Filed:, delete "April 9, 2001" and insert -- February 5, 2001 --

Signed and Sealed this

Twelfth Day of October, 2004

JON W. DUDAS
*Director of the United States Patent and Trademark Office*